Jan. 15, 1957 E. C. BOOTH 2,777,568
TRAP BOX FOR VEHICLE CHANGE HOLDER
Filed June 1, 1954 2 Sheets-Sheet 1

INVENTOR.
EMERY C. BOOTH
BY
ATTORNEY

Jan. 15, 1957  E. C. BOOTH  2,777,568
TRAP BOX FOR VEHICLE CHANGE HOLDER
Filed June 1, 1954  2 Sheets-Sheet 2
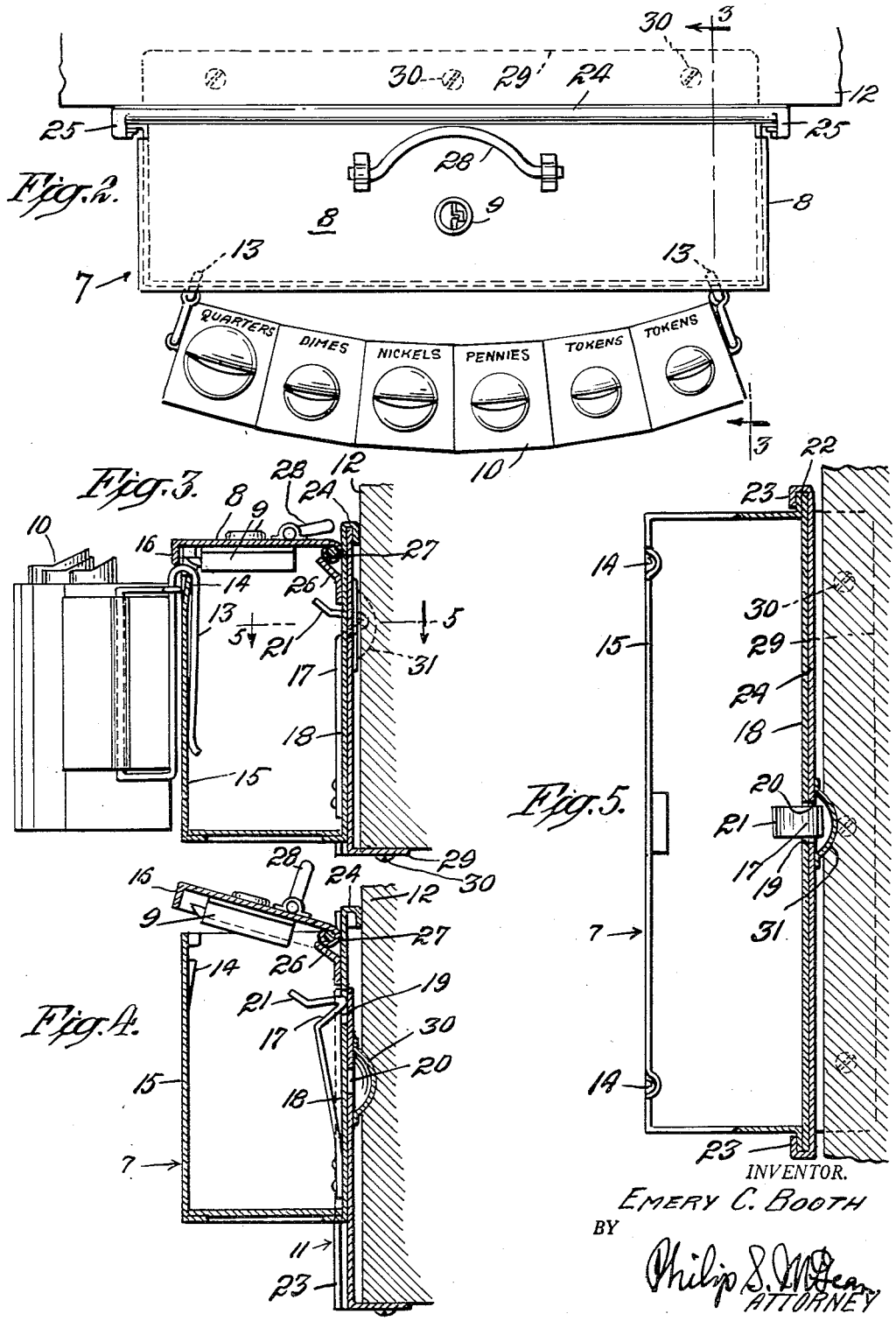
INVENTOR.
EMERY C. BOOTH
BY
ATTORNEY

United States Patent Office 2,777,568
Patented Jan. 15, 1957

2,777,568

TRAP BOX FOR VEHICLE CHANGE HOLDER

Emery C. Booth, Takoma Park, Md., assignor of a joint interest to Olga M. Booth, Takoma Park, Md.

Application June 1, 1954, Serial No. 433,661

1 Claim. (Cl. 206—.81)

The invention disclosed in this patent application is a trap box for use by motormen, bus drivers and operators of public conveyances requiring the carrying of money and the making of change.

Objects of the invention are to provide a safe carrier in the nature of a cash box which may be locked into place on the vehicle and which will provide a locked support for containing or for holding the change-making device and which at times may carry coins amounting to substantial value.

Particular objects of the invention are to provide the cash box in a form which will support the change carrier in a position for convenient use and which will hold it locked in that relation so that it cannot be removed except by the one in authority.

Other important objects of the invention are to provide a trap box of the character indicated which can be readily mounted in locked relation on buses and other vehicles currently in use, which will not take up much space or be in the way in the vehicle and which may be built and installed at reasonably low cost.

Other desirable objects and the novel features of construction, combination and relation of parts through which the purposes of the invention are attained, are set forth and will appear in the course of the following specification.

The drawings accompanying and forming part of the specification illustrate a present commercial embodiment of the invention, but structure may be modified and changed as regards the immediate illustration, all within the true intent and scope of the invention as hereinafter defined and claimed.

Fig. 1 in the drawings is a front elevation of the complete box with change-maker mounted on the front of the same and cover lifted to permit removal and replacement of the change device;

Fig. 2 is a top plan view of the trap box complete, as installed on a bus or other public conveyance, parts of the latter indicated in broken lines;

Fig. 3 is a vertical cross-sectional view as on substantially the plane of line 3—3 of Fig. 2, showing the box locked in place on the vehicle and the change-holder locked in position for use on the front of the box;

Fig. 4 is a similar view with cover unlocked and changeholder removed and with the lock for securing the box shown released to permit removal of the box from the vehicle;

Fig. 5 is a broken and part horizontal sectional view of the box with the back wall and mounting plate appearing in section as on line 5—5 of Fig. 3, but with the front wall portion of the box appearing in top plan.

Figure 1:
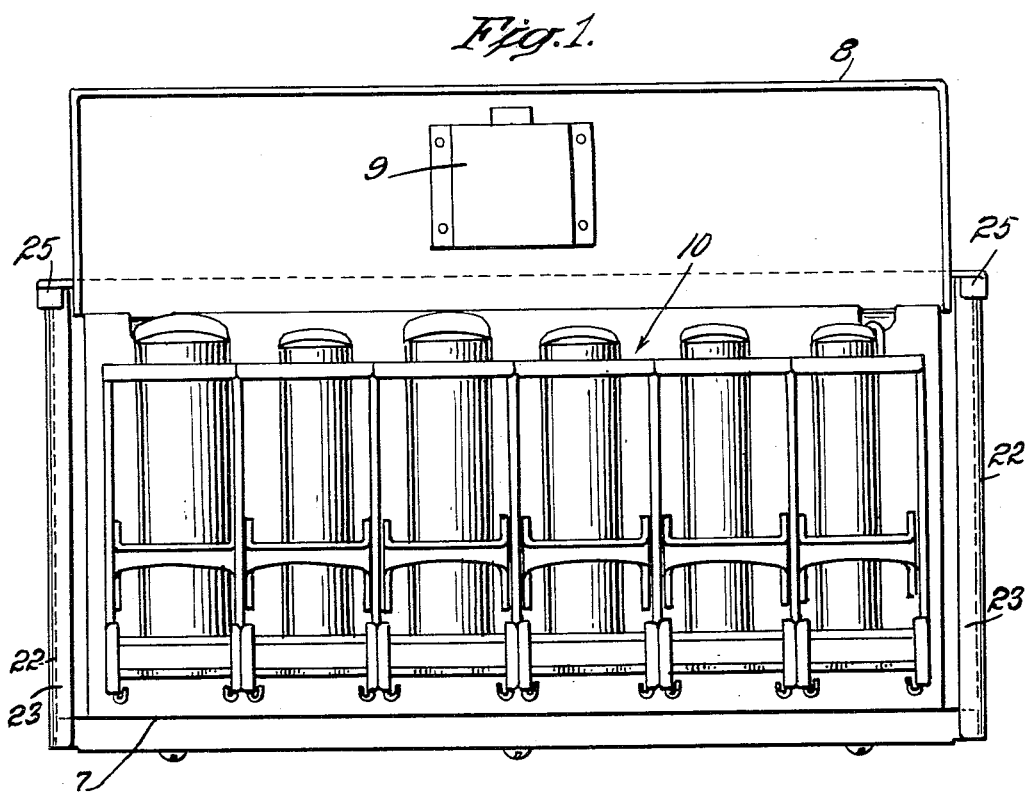

Broadly considered, the invention comprises what may be termed a cash box 7 adapted to contain cash and other accoutrement of a bus driver or other such operator, having a hinged cover 8 adapted to be secured by a lock 9, constructed to either contain or to support a change carrier 10 in position for use and adapted to be locked to a supporting bracket 11 on the bus or vehicle structure indicated at 12.

The change carrier 10 may be of any usual or special design, that indicated being of conventional structure adapted to carry quarters, dimes, nickels, pennies and tokens, as more or less usual.

This change holder is shown as having hooks 13 at the ends by which it may be caught over a belt and which hooks in the present instance, are adapted to be engaged in notches at 14 in the front wall 15 of the box, where it may be secured locked in such relation by the overstanding dependent edge flange 16 of the cover.

The box is shown as locked in position on the supporting bracket 11 by having a spring bolt 17 on the inside of the back wall 18 project through opening 19 in the back wall into a keeper opening 20 in bracket 11, Fig. 3.

The spring bolt 17 is shown as having a grip 21 at the top which when the box is open as in Fig. 4, may be engaged by a finger to retract the bolt from holding engagement with the keeper 20.

The box is shown as having end flanges 22 projecting at the back of the box into sliding engagement in retainer grooves 23 at the ends of the supporting bracket, Fig. 5, and the back wall is shown as carrying a downturned hooked flange 24 at the top to cover the top edge of the supporting bracket 11 and prevent entry of a screw-driver, knife blade or the like which might otherwise be used to effect retraction of the spring locking bolt 17.

The top flange 24 of the box back is also shown as carrying guard extensions 25, Figs. 1 and 2, reaching out over the upper ends of the side retainer flanges 23.

Also, a guard flange 26 is shown in Figs. 3 and 4 on the back wall of the box beneath the hinge 27 to prevent a knife blade, screw-driver or other such instrument being inserted in back of the hinge to effect release of the locking bolt 17.

When the box is mounted on the supporting bracket and the cover closed and locked, the box will be locked in supported position on the vehicle and may not be removed without the key required to unlock the cover.

In this locked condition the change carrier may be secured locked in convenient position for use on the front of the box by the engagement of the supporting hooks of the change carrier beneath the flange of the locked cover, Fig. 3. Thus the change holder will be secured locked in position for use. The only way then to remove the change holder is through use of the key to unlock the cover, and which key may normally be in possession of the bus driver or vehicle operator.

The single key thus secures the cash box in position on the vehicle and the change holder in the position of use on the front of the box. The key required to release the lock may be of the "pop-out" type, thus requiring the operator to keep it in his possession and not leave it in the lock where otherwise it might be actuated by an unauthorized person.

The box may be large enough to hold any desired amount of bills and coins, the change carrier and the account book ordinarily carried by the driver.

When the cover is unlocked and opened and the back lock released to permit removal of the box from the conveyance, the change carrier may be lifted off the front wall and dropped into place in the box and the cover then closed to lock the entire box contents. In this condition the box forms a convenient and safe carrier for cash and other valuables, it being shown as having a handle 28 for convenient carrying.

The mounting bracket 11 may be constructed for quick, convenient and secure mounting on the vehicle, in position for proper accessibility and use by the driver. The fastenings for securing it in place may be so located as to be covered and protected by the box when the latter is in position thereon, so that the box locked in this relation will afford protection for preventing unfastening of the mounting bracket from the vehicle.

In the illustration this bracket is shown as having an angular flange 29 at the bottom secured by fastenings 30 more or less inaccessible to unauthorized persons.

As a further safety measure the keeper opening 20 in the supporting bracket may be covered at the back by an enclosure 31, inaccessible when the bracket is mounted.

What is claimed is:

The combination of a change holder, a box for housing the latter when not in use, said box having a hinged cover, means for mounting the box on a conveyance including a bracket adapted to be secured to the conveyance and means for attaching the box to said bracket, means manipulable to disable said attaching means but so manipulable only when accessible by way of the top of the box when said cover is lifted, means carried by the change holder engageable with a wall of the box for releasably suspending the coin holder from the box at its exterior, means carried by the cover effective when the cover is closed for preventing release of said suspending means, and a single locking means carried partially by the box and partially by said cover for locking the cover closed thereby to lock the box closed and for holding the change holder in protective confinement should it then be housed in the box for maintaining ineffective said means for releasing said suspending means should the change holder then be suspended from the box at its exterior and for maintaining said manipulable means in protective confinement to prevent unauthorized manipulation of said disabling means thereby to prevent detachment of the box from the conveyance, said means for attaching the box to said bracket including a lock having a spring member secured near one end to the inside of the rear wall of the box, a reentrant bend in said member establishing a nose directed toward said rear wall, said lock further including a keeper for said nose carried by the bracket and said rear wall having an opening alignable with said keeper to allow entry of said nose into the keeper to lock the box to the bracket, said means manipulable to disable said attaching means being constituted by a finger-piece carried by said member at its end opposite to its first-named end, one of said bracket and box elements having edge formations so shaped as to establish opposed vertical channels hook-shaped in cross-section and the other of said bracket and box elements having edge portions slidable in said channels, the rear wall of said box having a downturned hooked flange at its upper edge engaged over the top edge of the bracket when said spring member is in locking engagement with said keeper.

References Cited in the file of this patent
UNITED STATES PATENTS

| | | |
|---|---|---|
| 403,535 | Johnson | May 21, 1889 |
| 1,521,248 | Mahan | Dec. 30, 1924 |
| 1,720,309 | Wakefield | July 9, 1929 |
| 1,762,458 | Wickert | June 10, 1930 |
| 2,097,480 | Visser | Nov. 2, 1937 |
| 2,652,944 | Visser | Sept. 22, 1953 |